(12) United States Patent  
Harris

(10) Patent No.: US 8,412,839 B2
(45) Date of Patent: Apr. 2, 2013

(54) PORTABLE PHONE REMOTE

(75) Inventor: Scott C. Harris, Rancho Santa Fe, CA (US)

(73) Assignee: Harris Technology, LLC, Rancho Santa Fe ( * ) Notice: Subject to any disclaimer, the term of this patent is extended or adjusted under 35 U.S.C. 154(b) by 792 days.

(21) Appl. No.: 12/491,075

(22) Filed: Jun. 24, 2009

(65) Prior Publication Data

US 2010/0330979 A1    Dec. 30, 2010

(51) Int. Cl.
G06F 15/16 (2006.01)
(52) U.S. Cl. ........ 709/229; 455/418; 455/419; 455/420; 725/37
(58) Field of Classification Search ............. 709/229; 455/418–420; 725/37
See application file for complete search history.

(56) References Cited

U.S. PATENT DOCUMENTS

| | | | |
|---|---|---|---|
| 2003/0002638 A1* | 1/2003 | Kaars | 379/110.01 |
| 2003/0163684 A1* | 8/2003 | Fransdonk | 713/153 |
| 2005/0122435 A1* | 6/2005 | Yunoki | 348/725 |
| 2006/0031889 A1* | 2/2006 | Bennett et al. | 725/80 |
| 2006/0088145 A1* | 4/2006 | Reed et al. | 379/88.19 |
| 2006/0172700 A1* | 8/2006 | Wu | 455/41.2 |
| 2007/0067808 A1* | 3/2007 | DaCosta | 725/62 |
| 2009/0081950 A1* | 3/2009 | Matsubara et al. | 455/3.06 |
| 2009/0113481 A1* | 4/2009 | Friedman | 725/46 |
| 2009/0228919 A1* | 9/2009 | Zott et al. | 725/34 |
| 2010/0145763 A1* | 6/2010 | Swanson, Sr. | 705/10 |

* cited by examiner

*Primary Examiner* — Thomas Dailey
(74) *Attorney, Agent, or Firm* — Law Office of Scott C. Harris, Inc.

(57) ABSTRACT

A video device and a remote control function for a video device that can be carried out over a remote device such as a phone. The phone connects to the video device over a network.

13 Claims, 3 Drawing Sheets

PORTABLE PHONE REMOTE

BACKGROUND

Cell phones are ubiquitous. Many people take their phone with them everywhere they go. People take their cell phones into the bathroom, when they sit down to relax, when they have a drink, literally everywhere.

SUMMARY

The present application recognizes that many modern televisions have network connections that are used to obtain updates such as electronic program guide updates, software updates, content and decryption keys. In a similar way, set-top boxes, such as digital video recorders, media players and other peripherals of this type are also network connected to obtain content and updates.

DETAILED DESCRIPTION

Figure 1:
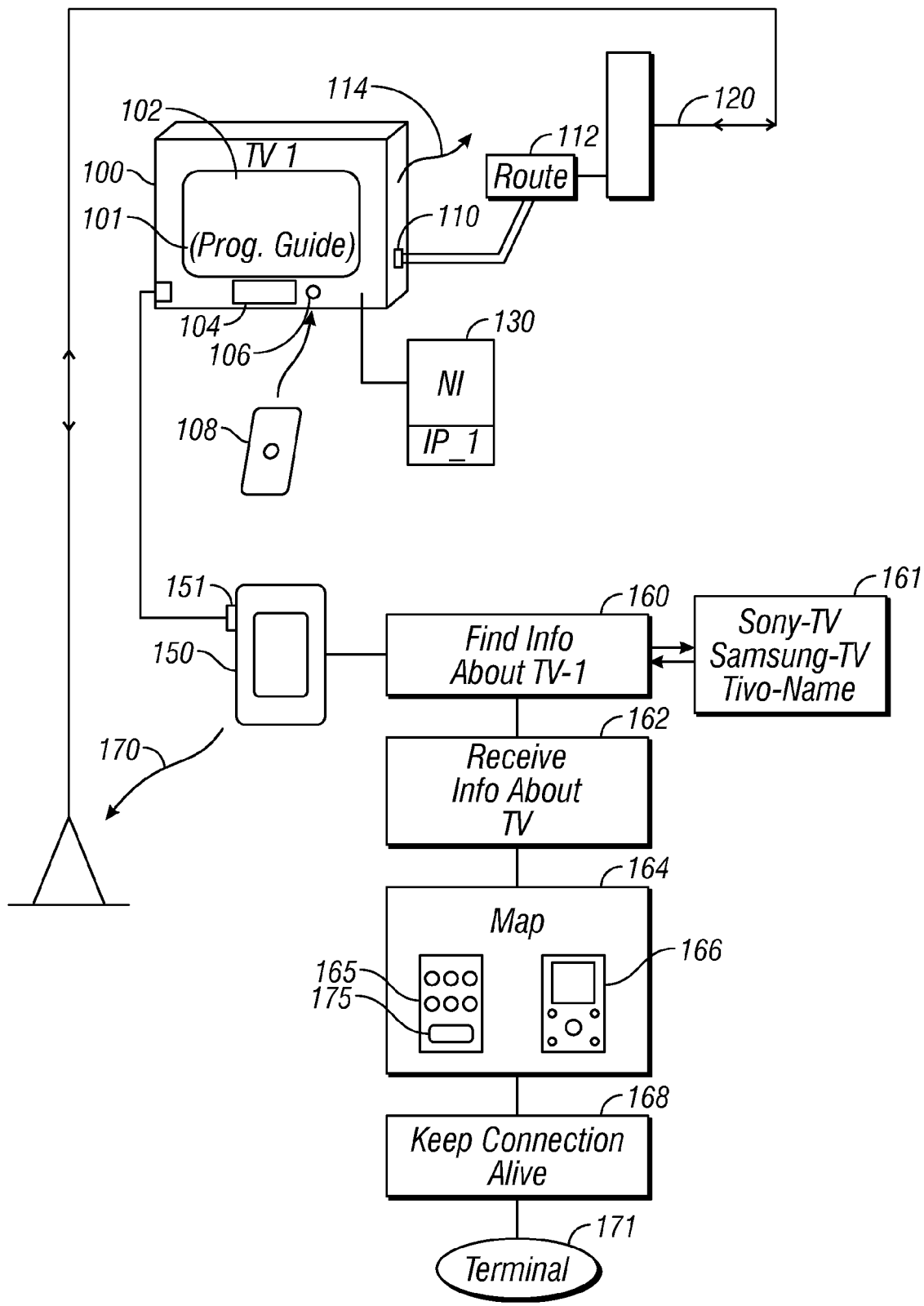
FIG. 1 shows a diagram of operation of a remote function according to an embodiment.

The present application describes using a portable device which is intended primarily for communication in order to control the functions of a remote controlled device such as a television or media player.

According to an embodiment, those functions are controlled by establishing contact over a network, and carrying out control over the network. This is used as an alternative to the conventional handheld control of controlling over a line of sight connection.

According to an embodiment, the video unit 100 may include a screen 102 and controls such as 104. One of those controls may be a conventional infrared remote receiver 106 commands from an infrared remote control 108. The video unit 100 also includes a network connection 110 which may be an ethernet port intended to connect to an Ethernet source such as 112. In another embodiment, the connection to the network may be wireless such as 114.

These network connections have been used to update the firmware for the television, as well as update program material that may be displayed on a program guide such as 101. The network connects to a publicly available network such as the Internet, and obtains the information over the Internet.

In the embodiment, there is a network interface 130 within the television, and this network interface identifies itself to the network or server. For example, this network may identify itself by an IP address or by some other kind of unique address. The embodiment shows the network interface 130 using the IP address IP_1; however it should be understood that any other IP address could alternatively be used.

In the embodiment, in addition to controlling using a line of sight remote such as 108, a user can use their cell phone or PDA to control the controlled device such as the video device 100.

The description given herein refers to a touch screen style PDA, such as a Blackberry storm™ or an iPod™. However, it should be understood that any kind of phone could be used in this way. The phone operates to initially find information about TV1 (100). This routine may only be carried out the first time that the phone interacts with TV 100. 160 shows this operation.

This needs to be a secure connection, to be sure that the controller of the TV is actually authorized. The secure connection can be, in one embodiment, a direct wire connection between the data port such as 151 and a corresponding port on the TV to establish a link and to exchange keys. In another embodiment, this find the TV on a local network by browsing through a number of different TV possibilities. Responsive to finding information about TV_1, at 162, for example, this may browse the local network to receive a list of TVs that are on the local network shown as 161 allowing the user to select one of those TVs. Thereafter, the user can control that TV either over the local network, or via the internet.

At 162, the phone 150 receives information about command of the TV 100. For an embodiment where the DVR is a TV, this may simply be information about how to select programs to record. For TVs, this may be channel information. In one embodiment, may also be certain kind of program information that can be on that can be shown on the phone.

At 164, a map is received by the phone. This map provides a template that may be used on a touchscreen device to provide information about the different functions that can be controlled over the phone remote. The map is generically shown as 165. On a non-touchscreen phone, a map may be drawn on the screen of the phone, or just a partial map with arrows leading to other parts of the map. The screen is mapped to show the function of the keys on the phone when in the remote control mode. For example, the phone can be mapped so that pressing "3" controls "volume up" and "6" controls "volume down". A key is pressed to represent the function based on the meaning shown on the screen. The mapping at 164 maps keys on the user interface to a command of a remotely-controllable function.

Once entering the remote control mode—the phone becomes a remote control, and the keys on the phone are reconfigured to the new function. 168 represents keeping the connection live, and this is done by continuing to display the map, and at the same time sending periodic commands to the TV simply saying for example "hello" or some other command that allows the connection to be maintained.

Once the connection is "alive", the phone 150 is enabled to send commands over the cellular network 170 which are relayed via the Internet to the network card 130. The network card receives these commands, acts on these commands, and sends back information.

Since the keys and the function in this embodiment have been re-mapped to new functions, the embodiment recognizes that there should be a way to end the function and return to the phone function. Every screen may have an "escape" capability shown as 175. The escape may be by pressing the "0" key or the like. Pressing the escape button causes the program running on the phone 150 to terminate at 171. This ends the connection, and since the phone stops sending hello messages, eventually the connection terminates.

The "map" at 164 may be different maps for different phones. For example, a blackberry with more keys, might get more functions than a standard 13 key phone.

One aspect may require some kind of security to avoid un-authorized interference with a user's viewing. In the above described embodiment, the security may be provided by requiring a direct connection initially before remote commands are allowed. Another embodiment may require pairing, where the TV enters a pairing mode and displays a code; and that code must be entered on the phone before it can control the TV.

Figure 2:
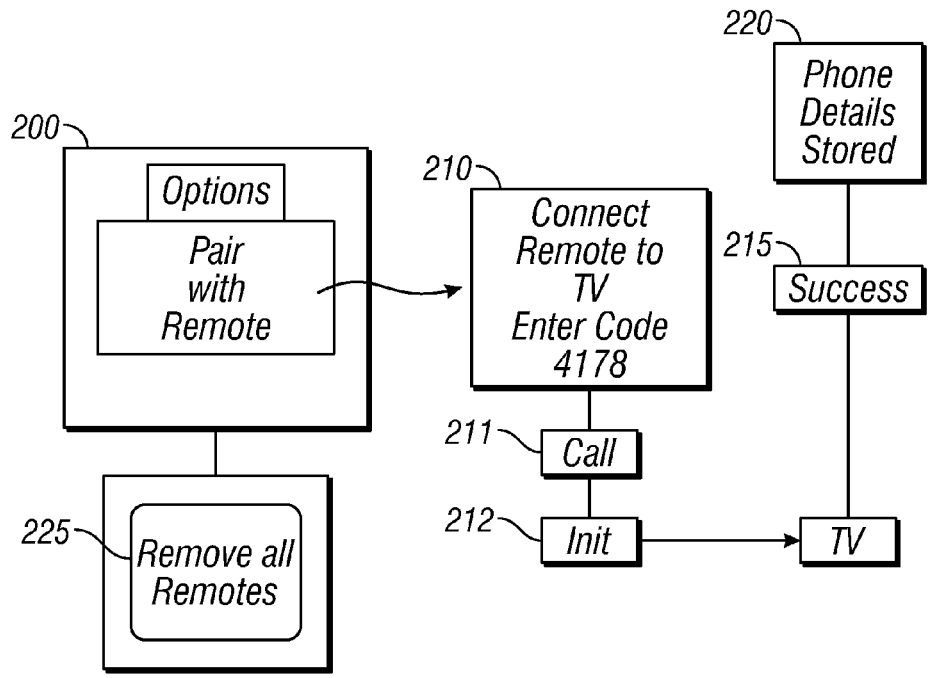
FIG. 2 illustrates a way of connecting between the controlled device and the remote.

In this embodiment, when a screenless TV is used, such as a DVR, the functions may be displayed on the host screen that is eventually hosting this information. The option shown at 200 in FIG. 2, is selecting pair with a remote, which when selected, causes another screen telling the user to connect remote to TV and to enter a special code, here 4178. A user presses 4178 on their phone, which is sent over the network, via the Internet or via the cell carrier 211 to the Internet 212 and eventually to the TV. The TV receives the code, and indicates success at 215. In response to the successful pairing, individual details of the phone are stored in the TV, allowing at 220, allowing that phone to thereafter control the TV. The TV may also use the phone information to determine a map that works for the phone depending on the phone complexity (touch screen, multi key or 13 key) and send back that map to the phone.

Another option from the options screen is to remove all remotes at 225. This might happen, for example, if someone with a remote is found to have been interfering with a person's operation. Removing all remotes that 225 may allow the user to start completely over again. For example, after removing all remotes, a new system may be entered.

Many phones have a reasonably high quality screen. In the FIG. 3 embodiment, the user can receive guide and preview information on their phone, as streamed from the TV. Each remote mode may be set as an option in the phone or TV, or the remote mode can be toggled between different modes.

Figure 3:
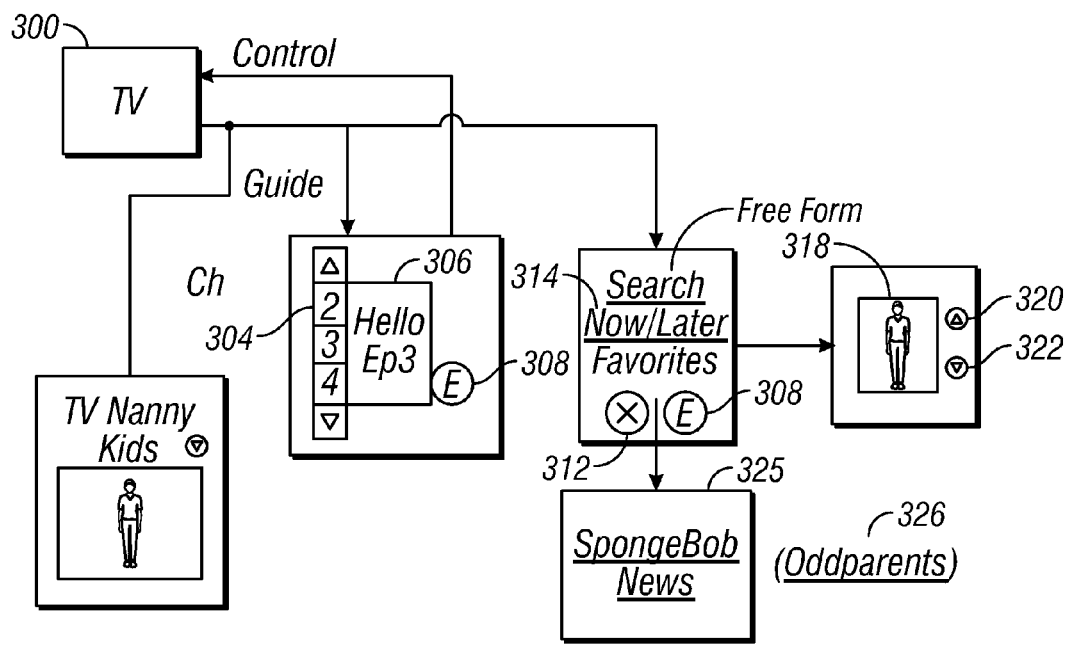
FIG. 3 shows different menus and controls.

FIG. 3 shows how a TV unit 300 with certain kinds of guide information can be controlled by the phone, but can also send abbreviated guide information to the phone. In the first mode 302, the guide information may be intended for display on a very small screen, e.g., a "YouTube" reduced resolution version. In this embodiment, there may be a small set of commands that are mapped, and a preview. For example, there may be a channels portion 304 which may include the user's favorite channels, and the ability to arrow up and down and between other channels. For any selected channel, there can be a preview portion that is returned for that channel at 306. Unlike the full guide information, this may include only a very small portion of the guide information. For example, it may be text only indicating the guide, or may be stop motion video. While in guide mode, the user can enter the escape key 308 at any time to escape back to a different mode of operation or can toggle to another screen at 309.

In another mode shown as 303, the control returns a few options including search, now/later, or favorites. Entering "search" allows the user to enter freeform text for example on the phone using either a full keyboard, or predictive typing on a keyboard. Another embodiment uses the microphone 312 on the phone to allow entering terms and automatically voice-recognizing those terms. The "now/later" may be a toggle, where clicking the now/later button (e.g., number 2 on the phone) once goes to "now", and provides information about either the most highly rated programs now or programs the user might find interesting. Clicking "later" provides information about future programs.

In one embodiment shown as 304, a very low resolution version of the currently playing program may be displayed as 318. This may be a low resolution version, for example 50 pixel or 100 pixels of resolution. The user has the ability to use keys such as 320, 322 to go up and down either for next or previous programs. The system thereby allows the users to find these previews.

The favorites mode at 325 may bring up a list of the last few successful things the user viewed that are currently playing. For example, out of all of the programs that the user likes to watch, only those ones that are available now may be returned. 325 for example shows SpongeBob and the News is available now, while showing odd parents 326 outside the box or as not available now. Since there is limited space on the phone, the outside the box functions are preferably not displayed, but may be at the user's request, along with an indication of when these programs will be available.

As in the other embodiments, the phone stays in this remote mode until escape 308 is pressed.

Yet another embodiment allows using this system as a TV nanny as shown in 330. The TV nanny allows a parent, who has previously entered information to establish themselves as having parental control over the TV, to automatically see a preview of what their child (kid_1) is currently watching on their TV. The preview may be a downsampled and compressed version of the show, but may include both the show and audio from the show. This may be provided directly from the TV in the downsampled form to the phone.

In another embodiment, rather than downsampled video, the system may simply provide a complete frame every second, and low-quality for example MP3 sound.

Another embodiment describes this same operation using a different kind of channel. For example, while the above describes establishing the channel from cell phone—via internet—to TV or other controlled device, the cell phone can communicate directly to the TV over a channel such as a back channel. One such back channel could be via Bluetooth, where the cell phone can communicate its remote information by Bluetooth. Another technique, however, may communicate via a non-communication channel. For example, in one embodiment, the phone is equipped with wireless HDMI or other wireless video transmission, and the TV also receives wireless HDMI, which it uses to communicate with peripherals such as DVD players and DVRs. In this embodiment, however, the phone transmits information stored on the phone via this wireless video format, to an external display. For example, a user could then display information from their phone on the external display, including playing videos and TV content from the phone on to the display. In this embodiment, the channel used to display the video on the external device can also be used to transmit the remote commands to that device. This can be done via a back channel or control signal either included in the video or modulated as part of the video.

Figure 4:
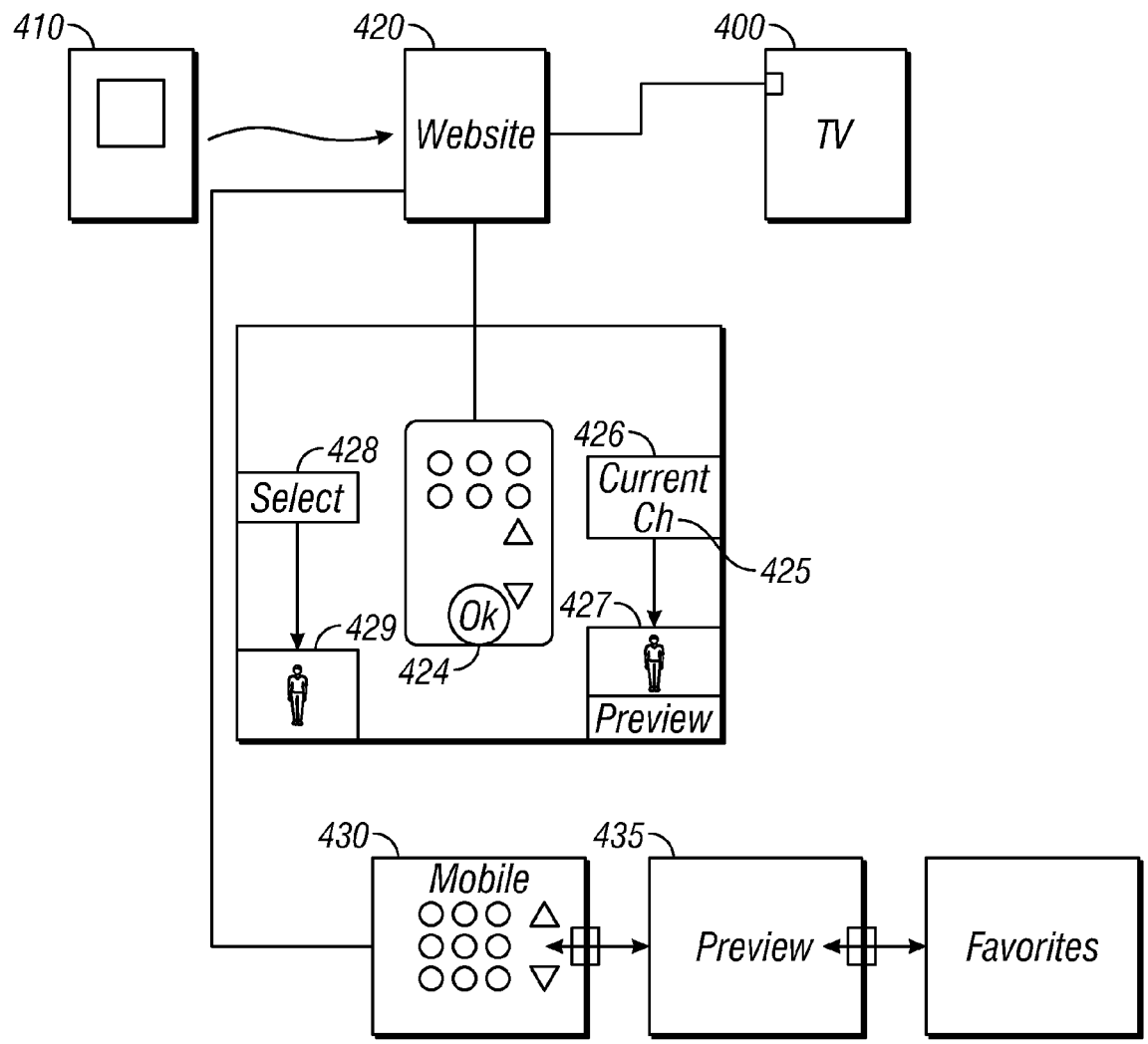
FIG. 4 shows an end to end system.

Another embodiment is shown in FIG. 4. In this embodiment, a website is used which interfaces between the video device 400, e.g., the TV, and the phone 410. The website 420 may be a website that is associated with the TV and has information about the operation of the TV. For example the website can be hosted by the TV manufacturer to allow users to connect to the TV. In this embodiment, the phone communicates with the website over the internet. The TV communicates with the website, also over the Internet. The website maintains information indicative of the different kinds of remote functions that can be carried out on the TV remotely. Therefore, when connecting to the website using a computer, for example, the website may provide, for example an image of a remote control where different controls on the image of the remote control can be selected. The areas on the image each are hyperlinked to a specified function. For example, the arrow up button on the image of the remote control can be hyperlinked to select the volume up function on the remote.

Pressing the volume up part of the image selects the volume up function. This causes an indication about the volume up to be sent to the TV.

As in the above embodiments, the website can provide a preview function for the current channel. The current channel is shown as 426, and a preview of the current channel is displayed as 427.

A future channel to be watched can also be previewed. For example, the user can select channels on the remote and preview them before actually changing the channel. When the user puts the cursor on a channel at 428, and a preview of that selected channel is viewed as 429. However, the TV still displays the current channel 426, since the other channels are just being previewed. The channel 428 is not actually selected until the user executes the enter button at 424. The enter button causes the TV channel to be changed to the selected channel 428. In this way, the user can preview channels before selecting them, while continuing to view the current channel. The TV channel is not changed until the enter button is pressed.

The website may provide a mobile version at 430 that provides information for a miniature sized version of the remote. The mobile version may provide a reduced version of the above, and may provide different functions on different screens. For example, the mobile version may have only the keys for the remote on one remote screen. The remote screens cycle between different screens which show the different content. Screen 435 shows preview, and favorites based on the user's previous viewing habits. For example, when the user moves between screens, the user can obtain different functions, such as shown in the embodiments of FIGS. 1-2, specifically, the search now/later, previews, and favorites.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other devices can be controlled in this way. Other channels can be used for the operation.

The above embodiment has been described operating using a portable phone and can also use a PDA. However, the operations described herein can also be carried out in any computer, and more preferably, any mobile computer.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A video device, comprising:

a video producing unit, which produces video information, having a first output which outputs said video information, and a network port, which connects to a network; and said video producing unit having a processing part, which operates to operate a controlling program, said controlling program enabling receiving commands directly from a portable computer for controlling said video information, and also receiving commands from said portable computer over said network via another network device that relays the commands from said portable computer, said commands controlling the producing of said video information by said video producing unit at a time when said commands are received, where said video producing unit also receives program guide updates over the same said network and also receives also receives updates to said controlling program over the same said network, wherein said processing part establishes a connection with said portable computer that has internet access and that is remote from said video producing unit, and accepts commands from said portable computer, and wherein said video device runs a security routine that requires communicating with said portable computer over a local network and determining if said portable computer is authorized to control said video device over said local network, and accepts commands only from portable computers which are authorized to control said video device over the internet, and further comprising said processing part running a routine that pairs with said portable computer over the local network while checking to determine that the pairing is over the local network, and stores details about said portable computer, and thereafter accepts commands from said portable computer over the internet.

2. The device as in claim 1, wherein said video device provides an output to said portable computer that provides information to said portable computer about controlling said video device over a network connection.

3. The video device as in claim 1, wherein said network connection is over the Internet, wherein said portable computer connects to said Internet and wherein said video device connects to the Internet.

4. The video device as in claim 1, wherein said video producing unit provides a preview of what is currently playing on said video device, to said portable computer, where said preview is less than a complete video that is currently playing.

5. The video device as in claim 1, wherein said video producing unit determines a type of the portable computer, and provides a map to the portable computer that maps a user interface of the portable computer to controls on the video device, where said map of said user interface is based on said type of portable computer.

6. A method, comprising:

from a portable computer device, establishing communication with a remote video device which is accessible over a network, wherein said establishing a connection comprises establishing a connection from said portable computer device, which is relayed via another network device over the internet, and from the another network device to said remote video device over a network connection; and from said portable computer device, entering commands which are communicated to the internet and which change an item which is currently being viewed on said remote video device, wherein said establishing a connection establishes the connection with said portable computer that has internet access and that is remote from the remote video device, and accepts commands from said portable computer device, and running a security routine that requires communicating with said portable computer over a local network and determining if said portable computer device is authorized to control said video device over said local network, and accepting commands only from portable computers which are authorized to control said video device over the internet; and running a routine that pairs with said portable computer device over the local network while checking to determine that the pairing is over the local network, and stores details about said portable computer device, and thereafter accepts commands from said portable computer device over the internet.

7. The method as in claim 6, wherein said commands include commands to control a current program that is playing on the remote video device.

8. The method as in claim 6, further comprising viewing a preview of a current item that is playing on the remote video device, on said portable computer device, where said preview is less than a complete video that is currently playing.

9. The method as in claim 6, further comprising sending information indicative of a type of said portable computer device to said remote video device, and receives information of a map that maps a user interface of the portable computer device to controls on the remote video device, and accepts controls based on said map that configure said portable computer using information from said map, where said map of said user interface is based on said type of portable computer.

10. The method as in claim 6, wherein said establishing communication comprises establishing communication with a website that is in communication with said video device.

11. A video device, comprising:
a video producing part, which produces a video output, based on a local command indicating a desired video output; and
a network part, which automatically connects to a local network and to the internet, and which and establishes a communication with a portable computer device which is accessible over the network, wherein said connection is from said portable computer device, to the Internet, and from the Internet to said video producing part;

said network part receiving commands which have been communicated via the internet and which change an item which is currently being viewed as said video output, wherein said network part carries out a security routine, which identifies said portable computer device to said network part, prior to accepting commands from said portable computer device over the internet, where said security routine communicates over only a local network to said portable computer device, and requires communicating only over the local network, and said commands communicate over only the internet and are relayed via the internet to said video producing part, wherein said network part establishes a connection with said portable computer device that has internet access and that is remote from said video producing unit, and accepts commands from said portable computer device, and wherein said video producing unit runs a security routine that requires communicating with said portable computer device over a local network and determining if said portable computer is authorized to control said video device over said local network, and accepts commands only from portable computers which are authorized to control said video device over the internet, and further comprising said network part running a routine that pairs with said portable computer over the local network while checking to determine that the pairing is over the local network, and stores details about said portable computer, and thereafter accepts commands from said portable computer over the internet.

12. The video device as in claim 11, wherein said network part provides a preview of said of a current video output being produced by said video producing part to a remote, network-connected, device which connects to said video producing part, where said preview is less than less than a complete video that is currently playing.

13. The video device as in claim 11, wherein said video producing unit determines a type of the portable computer device, and provides a map to the portable computer device that maps a user interface of the portable computer device to controls for the video producing part, where said map of said user interface is based on said type of portable computer.

* * * * *